United States Patent
Holcombe, Jr. et al.

(10) Patent No.: US 12,421,172 B2
(45) Date of Patent: *Sep. 23, 2025

(54) REFRACTORY FOAM

(71) Applicant: ZYP Coatings, Inc., Oak Ridge, TN (US)

(72) Inventors: Cressie E. Holcombe, Jr., Knoxville, TN (US); Patrick J. Ritt, Knoxville, TN (US); William Brent Webb, Oak Ridge, TN (US)

(73) Assignee: ZYP Coatings, Inc., Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,264

(22) Filed: Sep. 18, 2023

(65) Prior Publication Data

US 2024/0002301 A1 Jan. 4, 2024

Related U.S. Application Data

(60) Division of application No. 17/177,937, filed on Feb. 17, 2021, now Pat. No. 11,795,117, which is a continuation-in-part of application No. 15/960,779, filed on Apr. 24, 2018, now abandoned, and a continuation-in-part of application No. 15/906,361, filed on Feb. 27, 2018, now Pat. No. 11,629,094.

(51) Int. Cl.

| | | |
|---|---|---|
| C04B 41/45 | (2006.01) | |
| C04B 38/00 | (2006.01) | |
| C04B 38/08 | (2006.01) | |
| C04B 41/00 | (2006.01) | |
| C04B 41/50 | (2006.01) | |

(52) U.S. Cl.
CPC ...... *C04B 41/4582* (2013.01); *C04B 38/0025* (2013.01); *C04B 38/0074* (2013.01); *C04B 38/08* (2013.01); *C04B 41/009* (2013.01); *C04B 41/455* (2013.01); *C04B 41/5027* (2013.01); *C04B 41/5035* (2013.01)

(58) Field of Classification Search
CPC ....... C03C 11/007; C03C 3/064; C03C 3/089; C04B 14/22; C04B 14/24; C04B 14/4625; C04B 2103/0007; C04B 2111/00525; C04B 2111/00551; C04B 22/0013; C04B 24/383; C04B 28/24; C04B 35/66; C04B 38/0025; C04B 38/0074; C04B 38/02; C04B 38/08; C04B 40/0268; C04B 41/009; C04B 41/455; C04B 41/4582; C04B 41/5006; C04B 41/5027; C04B 41/5035; C04B 41/5089; C04B 41/85
See application file for complete search history.

(56) References Cited

U.S. PATENT DOCUMENTS

| | | | |
|---|---|---|---|
| 3,832,224 A | | 8/1974 | Brown |
| 4,997,698 A | * | 3/1991 | Oboodi ............. C03C 8/02 428/209 |
| 11,795,117 B2 | * | 10/2023 | Holcombe ............. C04B 38/02 |
| 12,264,111 B2 | * | 4/2025 | Holcombe, Jr. ........ C04B 38/08 |
| 2008/0300111 A1 | | 12/2008 | Meissner |
| 2010/0009203 A1 | | 1/2010 | Nageno et al. |
| 2017/0107379 A1 | | 4/2017 | Hamm et al. |
| 2019/0263714 A1 | * | 8/2019 | Webb ............. C03C 3/089 |
| 2019/0264033 A1 | | 8/2019 | Holcombe et al. |
| 2021/0163367 A1 | | 6/2021 | Holcombe, Jr. et al. |
| 2021/0189149 A1 | | 6/2021 | Holcombe, Jr. et al. |

FOREIGN PATENT DOCUMENTS

WO 1999016726 A1 4/1999

OTHER PUBLICATIONS

Co-pending U.S. Appl. No. 17/191,890, filed Mar. 4, 2021.
Co-pending U.S. Appl. No. 16/058,285, filed Aug. 8, 2018.
Barg et al., Cellular Ceramics by Direct Foaming of Emulsified Ceramic Powder Suspensions. J_ Am. Ceram. Soc., 91 (2008); The American Ceramic Society, 7 pages.
Studart, et al., "Processing Routes to Macroporous Ceramics: A Review," J_ Am. Ceram. Soc., 89 (2006); The American Ceramic Society, 19 pages.
Zhenyu, Lai et al., "Preparation of Porous Materials by Magnesium Phosphate Cement with High Permeability," State Key Laboratory of Environment-Friendly Energy Materials, School of Materials Science and Engineering, Southwest University of Science and Technology, Mianyang 621010, China, Sep. 9, 2018, 8 pages.
Mao, Xiaojian, "Processing of Ceramic Foams," Chapter 3, 2018, 18 pages (see link at https://www.intechopen. :: om/books/recent-advances-in-porous-ceramics/processing-of-ceramic-foams).
Vogt, Joachim, "Cost-Efficient Directly Foamed Ceramics for High-Temperature Thermal Insulation," Technology Insights, 6 pages. Retrieved Jun. 22, 2021.
Schundler Product Guide, The Schundler Company, "Perlite/Silicate Composites for High Temperature Insulation and Foamed Shapes," http://www.schundler.com/composites.htm, 3 pages. Retrieved Jun. 22, 2021.
Perlite Institute, "Perlite as Insulation," https://www.perlite.org/insulation, 4 pages. Retrieved Jun. 22, 2021.

* cited by examiner

*Primary Examiner* — Alicia Bland
(74) *Attorney, Agent, or Firm* — Seth L. Hudson; Maynard Nexsen PC

(57) ABSTRACT

A porous refractory in the $K_2O$—$SiO_2$—$B_2O_3$ system is formed by chemical direct foaming by heating to over 600° C., resulting in adherent black or white foam. The foam can function as highly porous thermal insulation, a high or low thermal emissivity surface, as a sealant for deteriorated refractory surfaces, as a filler for pockmarks/holes/gaps or as a bonding agent for parts with large gaps between them.

3 Claims, No Drawings

REFRACTORY FOAM

FIELD OF THE INVENTION

The invention disclosed herein relates generally to the field of refractory coatings and more specifically to a porous refractory foam formed from a liquid coating on heating.

BACKGROUND OF THE INVENTION

The parent applications referred to above define a tough, dense, hard, corrosion resistant, very flexible coating for ferrous metals found in the system $R_2O$—$SiO_2$—$B_2O_3$ using $K_2O$, $Na_2O$ or $Li_2O$ whereby the coating is made very corrosion resistant to aluminum by adding boron nitride (h-BN, hexagonal boron nitride) into the composition. All of the characteristics of these coatings as described therein are incorporated herein by reference to the entire disclosure thereof. The systems described therein are capable of further uses and new discoveries within those systems.

SUMMARY OF THE INVENTION

It is an object of this invention to find further uses of compositions within the system $R_2O$—$SiO_2$—$B_2O_3$ as defined in the parent applications.

This object as well as other objects are accomplished utilizing the refractory from the $K_2O$—$SiO_2$—$B_2O_3$ system which upon coating and firing produces a highly porous layer formed from the foaming of that composition upon heating.

DETAILED DESCRIPTION

According to this invention it has been found that upon coating and firing to a temperature in excess of 600° C., an expanded foam coating having a greater thickness than the original unfired coating results due to the formation of foam therein. The foam, formed in situ by chemical direct foaming, provides a rigid, adherent s thermally insulating layer. The foam, once applied and formed, can function as highly porous thermal insulation or as a high or low thermal emissivity surface, being either black or white visually depending on starting liquid composition. This foam can also be useful for sealing cracks in refractory materials, having gaps; deteriorated surfaces of refractory materials such as filling pock marks, holes or gaps; or to bond parts having spaces there between. Compositions described herein adhere well to both ceramic and metal surfaces.

Preferred compositional ranges for use in this invention are 2 to 30 weight percent $K_2O$; 10 to 74 weight percent $SiO_2$; and between 23 to 79 weight percent $B_2O_3$. The most preferred composition is 15 to 25 weight percent $K_2O$; 35 to 50 weight percent $SiO_2$; and between 30 to 50 weight percent $B_2O_3$. The useful temperature range can be extended with additions of alumina, ceria, yttria, zirconia, hollow or dense glass microspheres, and other refractory materials in the form of powders, beads or fibers.

Cracks or other deteriorated surfaces of refractory material are sealed by applying the composition like a mortar and heating after drying to a temperature above 600° C., preferably about 700° C. causing the composition to foam. Upon heating to about 700° C., a foam forms and expands. The foam exhibits a porosity of 45 to 65%, generally averaging about 56%.

A preferred composition is 17 weight percent $K_2O$, 35.6 weight percent $SiO_2$, 47.4 weight percent $B_2O_3$ formed into a paint with water and then heated to form the expanded foam. The thickness of the coating applied depends on the initial application (after drying) and can vary depending on the desired thickness of the resulting foam. Applied thicknesses are commonly in the range of ¼" (6.35 mm) to ¾" (19.05 mm) but can be slightly thinner or thicker. Foaming takes place after a one time heat to 700° C., whether the coating is thoroughly dried or not. The refractory foam has variable porosity depending on the heating conditions and is typically about 5 times the original thickness of the dried coating.

As shown in the examples, the final foam layer can be visually black or white depending on the starting composition ingredients. This has the advantage of controlling the emissivity of the resulting foam which, when applied to the interior of a furnace, can increase uniformity and decrease heat up time. This foam can expand and fill damaged areas of ceramic or metal surfaces, adhering well to all refractory surfaces whether dense or porous.

Having generally described this invention, the following specific examples are given as further disclosures of the benefits thereof.

The following raw materials were used in these examples:

Potassium tetraborate tetrahydrate powder ($K_2B_4O_7 \cdot 4H_2O$)

Ammonium pentaborate tetrahydrate powder ($NH_4B_5O_8 \cdot 4H_2O$)

Colloidal silica aqueous dispersion with 50 weight percent $SiO_2$ in water (trade name Bindzil 9950, now Levasil F09950).

Potassium hydroxide solution with 45 weight percent KOH in water.

Potassium silicate powder (trade name Kasolv 16) with 32.5 weight percent $K_2O$, 52.8 weight percent $SiO_2$, and 14.5 weight percent $H_2O$; 1.6 weight ratio of $K_2O$ to $SiO_2$.

A mixture of these raw materials can yield the correct molar ratios for the potassium borosilicate main formulation of 12.4 mole percent $K_2O$, 40.7 mole percent $SiO_2$, and 46.9 mole percent $B_2O_3$— which expressed in weight percent is 17 weight percent $K_2O$, 35.6 weight percent $SiO_2$, 47.4 weight percent $B_2O_3$. Also, a different mixture of these raw materials can yield the molar percentages of another favorable composition, 16.4 mole percent $K_2O$, 53.7 mole percent $SiO_2$, 29.9 mole percent $B_2O_3$—which expressed in weight percent is 22.5 weight percent $K_2O$, 47.0 weight percent $SiO_2$, 30.5 weight percent $B_2O_3$.

Example I

A liquid coating composition was formed with 55.1 grams of potassium tetraborate tetrahydrate, 34.6 grams of ammonium pentaborate tetrahydrate powder, 71.2 grams of colloidal silica, 32 grams of water containing 2 percent cellulosic suspension agent. In weight percent, this composition is 28.6% potassium tetraborate tetrahydrate, 17.9% ammonium pentaborate tetrahydrate, 36.9% colloidal silica aqueous dispersion, and 16.6% water that contained 2 weight percent cellulosic suspender. Upon heating-firing, this composition leads to 12.4 mole percent $K_2O$, 40.9 mole percent $SiO_2$, and 46.7 mole percent $B_2O_3$, which expressed in weight percent is 17 weight percent $K_2O$, 35.6 weight percent $SiO_2$, 47.4 weight percent $B_2O_3$. This mixture was applied to several substrates and then heated to 700° C. in air whereby it formed a black foamy glassy material after approximately ½ hour. This formulation was thus found to bond well to ceramic, ferrous metal and reinforced fiberglass material substrates.

Example II

A liquid coating composition was formed with 66.7 grams of potassium tetraborate tetrahydrate, 6.6 grams of potassium hydroxide solution, 94.0 grams of colloidal silica aqueous dispersion. In weight percent, this composition is 39.9% potassium tetraborate tetrahydrate, 3.9% potassium hydroxide solution, 56.2% colloidal silica solution/suspension. Upon heating-firing, this composition leads to 16.4 mole percent $K_2O$, 53.7 mole percent $SiO_2$, and 29.9 mole percent $B_2O_3$, which expressed in weight percent is 22.5 weight percent $K_2O$, 47.0 weight percent $SiO_2$, weight percent $B_2O_3$. This mixture was applied to several substrates and then heated to 700° C. in air whereby it formed a white foamy glassy material after approximately ½ hour. This formulation was thus found to bond well with to ceramic, ferrous metal and reinforced fiberglass material substrates.

Example III

A liquid coating composition was formed with 66.7 grams of potassium tetraborate tetrahydrate, 7.7 grams of potassium silicate powder, 86.0 grams of colloidal aqueous dispersion. In weight percent, this composition is 41.6% potassium tetraborate tetrahydrate, 4.8% potassium silicate powder, 53.6% colloidal silica solution/suspension. Upon heating-firing, this composition leads to 16.4 mole percent $K_2O$, 53.7 mole percent $SiO_2$, and 29.9 mole percent $B_2O_3$, which expressed in weight percent is 22.5 weight percent $K_2O$, 47.0 weight percent $SiO_2$, 30.5 weight percent $B_2O_3$. This mixture was applied to several substrates and then heated to 700° C. in air whereby it formed a white foamy glassy material after approximately ½ hour. This formulation was thus found to bond well to ceramic, ferrous metal and reinforced fiberglass material substrates.

Example IV

The composition of Example I was mixed, dried, and then calcined at 700° C. for 4 hours in air (whether in stainless steel or ceramic crucible). A black foamy glass material was formed. It was noted that this mixture does not need to be dried or calcined before firing to form the foam. The foam formed after 30 minutes at 700° C.

This composition adheres to many ceramics, including fused silica and reinforced fiberglass material, and metals such as stainless steel. The foam does not adhere to BN parts or BN coatings. If a barrier coating is needed, BN was found to work well.

The volumetric expansion of the foam was determined using the Archimedes' water displacement method. A known volume of the composition of Example I was heated to 700° C. for minutes. The resulting foam was then submerged in water to determine the new volume. The volumetric expansion of the composition was determined to be approximately 5.4 times the original volume. The specific gravity of the foam was calculated to be 0.28 g/cm$^3$.

The foam was then crushed and uniaxially pressed in a 1-inch die with a force of 20,000 pounds, and then re-fired to 700° C. for 30 minutes. The specific gravity of the resulting glass button was 0.63 g/cm$^3$. Assuming a specific gravity of 0.28 g/cm 3 as calculated from the results of the water displacement test, this means the foam has approximately 56% porosity.

The effect of firing temperature was noted on tests performed on reinforced fiberglass:

200° C. will form a white crystalline material, which delaminates from refractory ceramic; if applied on top of an already-formed layer of foam, the white layer will stick at this temperature.

300° C. will form a brown or rust-colored layer, which is reasonably adherent to refractory ceramic.

Thus, adherence of the foam is established by heating the applied layer to approximately 300° C. in air.

Rather than applying one thick layer, the foam can be gradually built up, thus ensuring more robust mechanical properties, using the following procedure:

Apply and fire one layer-to approximately 300° C. or until the layer looks burnt/brown; repeat as needed; fire the assembly to 700° C. for 30 minutes to form a thick, robust foam layer.

Once formed, the foam can be reheated to at or near the foaming temperature (650-800° C.) to form a hard, tough surface. Depending on the additives or lack thereof, the foam can be used continuously from approximately 600 to 800° C. if the porous structure is to be maintained. Additives such as alumina fibers and hollow glass spheres were found to increase the strength of the foam and reduce the tendency of the foam to collapse at elevated temperatures.

Example V

The effects of various additives were tested on the same composition—i.e., Example 1. It was observed that certain additives, in the range of 2 to 30 weight percent addition, increased the strength of the foam after firing to 700° C. for 30 minutes. The same additives also tended to decrease the volumetric expansion of the composition at temperature. Additions of alumina powder, alumina bubble, alumina fibers, mullite, perlite, vermiculite, zirconia bubble, hollow borosilicate microspheres and bamboo fiber were observed to impart an increase in the mechanical strength of the foam. Additions of zinc oxide and certain compositions of hollow borosilicate microspheres lowered the melting temperature of the composition, such that the foam could form at temperatures less than 700° C. Additives such as cerium oxide, yttrium oxide and calcium borate had no observable effect on the foaming capability or the strength of the foam. Those skilled in the art can utilize the addition of a myriad high temperature materials beyond those mentioned here to modify the chemistry of the foam.

Example VI

With the composition of Example 1, the effects of various additives were tested up to 1000° C. It was observed that most materials added to the original composition did not allow the foam to maintain its porosity above 800° C. in air. In those cases, the structure of the foam collapsed, forming a tough, rigid, electrically insulating glass ceramic layer. However, the addition of five weight percent alumina fiber (trade name Saffil HA) and fifteen percent hollow borosilicate spheres (trade name Sphericel 34P30 and Sphericel 60P18) did prevent slumping of the foam up to 800° C. Specifically, adding 15 weight percent of Sphericel 60P18 hollow glass beads with mean particle size of 17 micrometers led to no evidence of flowing or collapsing of the foam at 800° C. Above 800° C., the structure of the foam is molten and it begins to flow and collapse.

Example VII

Multiple layers of the composition of Example 1 were applied and dried at 300° C. The additional coatings were applied at room temperature after each heating and each dried at 300° C. These multiple coatings were then heated to approximately 700° C. for ½ hour which led to a black refractory foam. Foam formed in this way will be more mechanically robust than a single thick layer of the composition that is applied and fired to 600-700° C.

Example VIII

The composition of Example 1 was coated onto fused silica and stainless steel parts and heated to 700° C. while still wet or damp or after thorough drying. This resulted in a black glassy appearing hard tough adherent foam.

Example IX

This example utilized each independent constituent which were heated to 700° C. for 4 hours. None of the individual constituents foamed. Thus, blends of the constituents leaving out one of them also did not foam when heated to 700° C. for 4 hours. It was thus found that all three components shown in Examples I, II, and III must be present together for foaming to occur.

The above examples indicate that heating to above 600° C. is required to generate the refractory foam. This heating is often accomplished with a typical furnace and done in air atmosphere. The heating method should not be limiting, since it is known that achieving the necessary temperature can be done with many other methods, such as heat lamps, gas-fired torches, and even lasers or solar concentrators, as long as the temperature of the composition reaches near "visual red heat" or the temperature above 600° C. to cause the foaming action. Also, the atmosphere should not be limiting, since inert atmospheres such as argon, nitrogen, helium or even vacuum are not expected to affect the formation of this refractory foam. The time needed for the foam to form, determined by the composition, is generally given as 30 minutes to 4 hours—which again should not be considering limiting for this refractory foam. It is recognized, as covered in the parent U.S. application Ser. No. 15/906,361, that the other alkali oxides, $Na_2O$ and $Li_2O$, can be utilized alone or as mixtures instead of or with $K_2O$ to produce refractory foam: thus, the use of $R_2O$ with R being K, Na, Li is contemplated and should not be considered limiting for this refractory foam. It is recognized that colloidal silica aqueous dispersions other than that mentioned above as 50 weight percent $SiO_2$ in water (trade name Bindzil 9950, now Levasil F09950) can be used such that the necessary weight percent of $SiO_2$ can still be achieved: thus, varying the percent of colloidal $SiO_2$ in the colloidal silica aqueous dispersion should not be considered limiting for this refractory foam. It is also recognized, as covered in the U.S. application Ser. No. 16/058,285 filed Aug. 8, 2018, that the ingredients of this refractory foam can be produced in a non-aqueous solution/suspension/dispersion—so use of non-aqueous solvents to create the foam should not be considered limiting for this refractory foam, nor should blends of water with non-aqueous solvent systems.

While the above detailed description was given with regards to specific compositions, the scope of this invention should be defined only by the following appended claims.

What is claimed:

1. A coating composition comprising:
    a mixture of potassium tetraborate tetrahydrate, ammonium pentaborate tetrahydrate, colloidal silica aqueous dispersion, and water, wherein heat-firing the mixture leads to a composition of $K_2O$—$SiO_2$—$B_2O_3$, and wherein drying and heating the composition of $K_2O$—$SiO_2$—$B_2O_3$ to a temperature above 600° C. forms a black refractory foam, and an additive comprising hollow borosilicate spheres or zinc oxide.

2. The composition of claim 1 where the weight percentages of the ingredients are:
    24.3% potassium tetraborate tetrahydrate;
    15.2% ammonium pentaborate tetrahydrate;
    31.4% colloidal silica aqueous dispersion;
    14.1% water; and
    15.0% of hollow borosilicate spheres or zinc oxide.

3. The composition of claim 2, wherein the water contains 2 weight percent of a cellulosic suspender.

* * * * *